US009816381B2

(12) United States Patent
Cortequisse

(10) Patent No.: US 9,816,381 B2
(45) Date of Patent: Nov. 14, 2017

(54) COMPOSITE BLADE MADE BY ADDITIVE MANUFACTURING

(71) Applicant: Techspace Aero S.A., Herstal (Milmort) (BE)

(72) Inventor: Jean-François Cortequisse, Heers (BE)

(73) Assignee: SAFRAN AERO BOOSTERS SA, Herstal (Milmort) (BE)

( * ) Notice: Subject to any disclaimer, the term of this patent is extended or adjusted under 35 U.S.C. 154(b) by 347 days.

(21) Appl. No.: 14/471,520

(22) Filed: Aug. 28, 2014

(65) Prior Publication Data

US 2015/0064016 A1    Mar. 5, 2015

(30) Foreign Application Priority Data

Aug. 28, 2013    (EP) ..................................... 13181970

(51) Int. Cl.
 *F01D 5/14*           (2006.01)
 *B22F 5/04*           (2006.01)
 (Continued)

(52) U.S. Cl.
 CPC ............ *F01D 5/282* (2013.01); *B22F 3/1055* (2013.01); *B22F 5/04* (2013.01); *B22F 7/08* (2013.01);
 (Continued)

(58) Field of Classification Search
 CPC ........ F01D 5/282; F01D 5/147; B22F 3/1055; B22F 5/04; B22F 7/08; B29C 67/0077;
 (Continued)

(56) References Cited

U.S. PATENT DOCUMENTS

| 3,762,835 | A | | 10/1973 | Carlson et al. |
| 3,892,612 | A | * | 7/1975 | Carlson ................... F01D 5/282 |
| | | | | 156/150 |

(Continued)

FOREIGN PATENT DOCUMENTS

| CN | 101649844 B | 10/2011 |
| CN | 103113112 A | 5/2013 |

(Continued)

OTHER PUBLICATIONS

European Search Report dated Jan. 28, 2014 for EP 13181970.8.

*Primary Examiner* — Marina Tietjen
(74) *Attorney, Agent, or Firm* — James E. Walton

(57) ABSTRACT

The present application relates to a blade of low pressure rectifier axial turbomachine. The blade can also be a rotor blade and/or a turbine blade. The blade includes a composite material with a matrix and a reinforcement that includes a mesh forming a three dimensional structure with a plurality of rods that describe a three-dimensional mesh based on polyhedrons. The three-dimensional structure extends over the majority of the thickness of the blade between the pressure side surface and the suction side surface and/or the majority of the length of the blade between the leading edge and the trailing edge. The rods of the reinforcement are bonded to each other and are distributed throughout the volume between the pressure side surface and the suction side surface of the blade. The rods form a three-dimensional mesh occupying the entire blade. The present application also relates to an iterative method for manufacturing a blade by additional layer manufacturing.

20 Claims, 3 Drawing Sheets

(51) Int. Cl.
  F01D 5/28    (2006.01)
  B22F 7/08    (2006.01)
  B29C 67/00   (2017.01)
  B22F 3/105   (2006.01)
  B29K 79/00   (2006.01)
  B29K 105/00  (2006.01)
  B29K 505/08  (2006.01)
  B29L 31/08   (2006.01)

(52) U.S. Cl.
  CPC .......... *B29C 67/0077* (2013.01); *F01D 5/147* (2013.01); *B29K 2079/085* (2013.01); *B29K 2105/251* (2013.01); *B29K 2505/08* (2013.01); *B29L 2031/08* (2013.01); *F05D 2230/31* (2013.01); *F05D 2300/603* (2013.01); *Y02P 10/295* (2015.11)

(58) Field of Classification Search
  CPC ............... Y02P 10/295; B29L 2031/08; B29K 2505/08; B29K 2105/251; B29K 2019/085; F05D 2230/31
  USPC ........................................................ 416/230
  See application file for complete search history.

(56) References Cited

U.S. PATENT DOCUMENTS

| | | | |
|---|---|---|---|
| 5,951,254 A * | 9/1999 | Sikorski | B32B 15/02 416/224 |
| 8,715,439 B2 * | 5/2014 | Chakrabarti | C04B 37/025 156/89.11 |
| 2006/0216154 A1 * | 9/2006 | McMillan | F01D 5/282 416/241 R |
| 2012/0201686 A1 | 8/2012 | Fromentin | |
| 2013/0195671 A1 * | 8/2013 | El-Wardany | F01D 5/286 416/229 R |

FOREIGN PATENT DOCUMENTS

| | | |
|---|---|---|
| DE | 102009048665 A1 | 3/2011 |
| EP | 2319641 A1 | 5/2011 |
| EP | 2620240 A1 | 7/2013 |
| FR | 2204215 A5 | 5/1974 |

* cited by examiner

COMPOSITE BLADE MADE BY ADDITIVE MANUFACTURING

This application claims priority under 35 U.S.C. §119 to European Patent Application No. 13181970.8, filed 28 Aug. 2013, titled "Composite Blade Made by Additive Manufacturing," which is incorporated herein by reference for all purposes.

BACKGROUND

1. Field of the Application

The present application relates to a composite turbomachine blade. More particularly, the present application relates to a composite blade with reinforcement and a matrix. The present application also relates to a turbine engine with a blade according to the present application. The present application also relates to a method of manufacturing a composite blade with reinforcement and a matrix.

2. Description of Related Art

An axial turbomachine comprises annular rows of rotor blades for accelerating a flow of air, and annular rows of stator blades which redress the flow of accelerated air. The blades must be lightweight to reduce the mass of the turbomachine. In particular, the reduction of rotor blades reduces the inertia of the rotor.

The reduction of a blade must nevertheless comply with the criteria of strength. A blade must withstand vibrations and possibly intakes in the turbomachine. Furthermore, a rotor blade must withstand centrifugal forces. The choice of a composite material for making a blade is a compromise to reduce its weight while maintaining a certain mechanical resistance.

It is known from patent document published FR2204215A5 a composite rotor blade of an axial turbocharger. The blade comprises a primary structure formed of a stack of composite sheets. These sheets have long fibers of graphite which are embedded in a cured resin. In addition, the blade comprises several layers of wire mesh inserted between the composite sheets and plated on top of the primary structure. The metal meshes are filled in advance with resin which crosslinks the resin of the stack during molding. However, the mechanical strength of such a blade is reduced. In addition, its production requires more preparation operation and handling of sheets that increases the cost of such a blade.

Although great strides have been made in the area of composite blades, many shortcomings remain.

DETAILED DESCRIPTION OF THE PREFERRED EMBODIMENT

Figure 1:
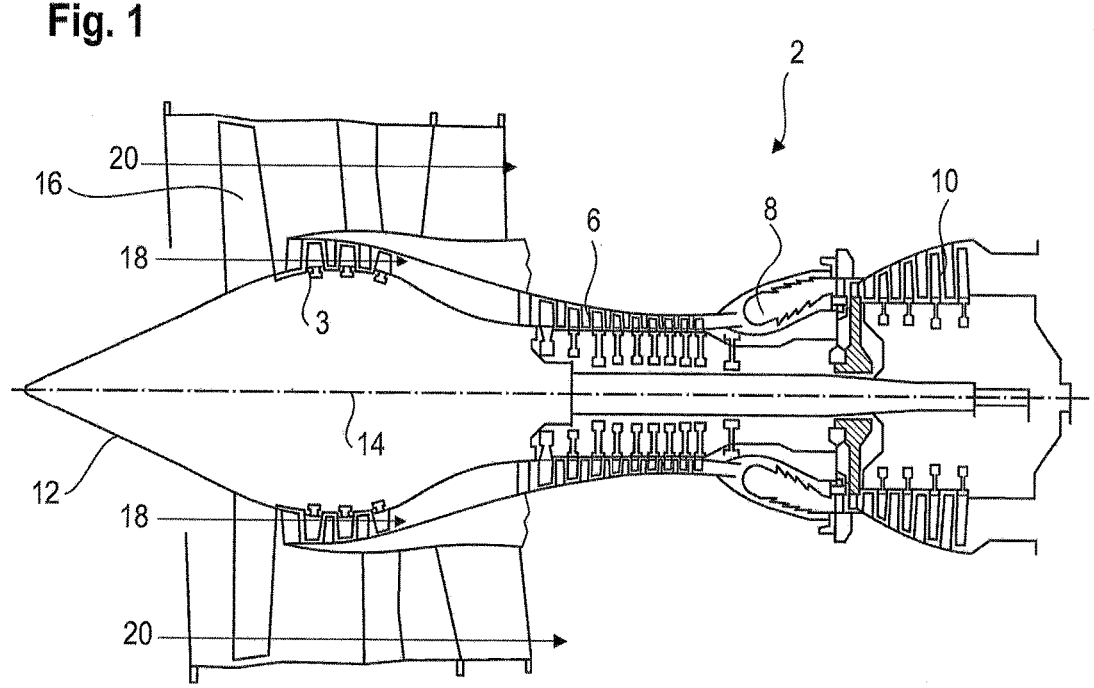
FIG. 1 shows an axial turbomachine according to the present application.

The present application aims to solve at least one of the technical problems of the prior art. More particularly, the present application aims to strengthen a composite blade. The present application also aims to provide a method of producing a blade according to the present application.

The present application relates to a turbomachine blade, the blade comprising a composite material with a matrix and a reinforcement comprising a mesh, the blade having a leading edge, a trailing edge, a pressure side surface and a suction side surface, said surfaces extending from the leading edge to the trailing edge, remarkable in that the mesh forms a three-dimensional structure extending over the majority of the thickness of the blade between the pressure side surface and the suction side surface and/or over the majority of the length of the blade between the leading edge and the trailing edge.

According to an advantageous embodiment of the present application, the three-dimensional reinforcing structure is a unitary structure with rods interconnected with material continuity by connecting nodes.

According to an advantageous embodiment of the present application, the rods are oriented in at least three non-coplanar directions, preferably by at least four non-coplanar directions.

According to an advantageous embodiment of the present application, the reinforcement occupies more than 60%, preferably more than 80%, of the thickness of the blade between the pressure side surface and the suction side surface.

According to an advantageous embodiment of the present application, the volume density of the mesh between the pressure side surface and the suction side surface varies depending on the height of the blade and/or from the leading edge to the trailing edge.

According to an advantageous embodiment of the present application, the reinforcement comprises, in addition, one or more walls forming the leading edge and/or the trailing edge and/or the pressure side surface and/or the suction side surface of the blade, said one or more walls being preferably unitary with the mesh.

According to an advantageous embodiment of the present application, the matrix and the reinforcement are made of different materials, the matrix comprising a thermoplastic resin and the reinforcement comprising metal, preferably titanium.

According to an advantageous embodiment of the present application, the reinforcement is made in one piece and produced by an additive manufacturing method with layers.

According to an advantageous embodiment of the present application, the three-dimensional structure extends through the blade on the majority of the thickness of the blade.

According to an advantageous embodiment of the present application, the three-dimensional structure extends perpendicular to the suction side surface on the majority of the thickness of the blade.

According to an advantageous embodiment of the present application, the three-dimensional structure forms a three-dimensional mesh.

According to an advantageous embodiment of the present application, the three dimensional mesh comprises an envelope, possibly a general envelope, which delimits a space occupying the majority of the volume between the pressure side surface and the suction side surface.

According to an advantageous embodiment of the present application, the rods which are linked to each other are attached directly to each other rods.

According to an advantageous embodiment of the present application, the reinforcement comprises more than one hundred, preferably more than thousand rods connected to each other.

According to an advantageous embodiment of the present application, the rods are distributed in the volume between the pressure side surface and the suction side surface.

According to an advantageous embodiment of the present application, at least one rod is curved.

According to an advantageous embodiment of the present application, at least one rod has a section variation.

According to an advantageous embodiment of the present application, the rods have different lengths.

According to an advantageous embodiment of the present application, at least one rod is generally spherical.

According to an advantageous embodiment of the present application, at least one rod is generally cubic.

According to an advantageous embodiment of the present application, the rod volume density is between 1% and 80% of the volume between the pressure side surface and the suction side surface, preferably between 5% and 50%, more preferably between 10% and 20%.

The present application also relates to a turbomachine blade, the blade comprising a composite material with a matrix and a reinforcement, the blade comprising a leading edge, a trailing edge, a pressure side surface and a suction side surface, both surfaces extending from the leading edge to the trailing edge, remarkable in that the reinforcement comprises a network of interconnected cavities, the network extending between the pressure side surface and the suction side surface and being filled with the matrix.

According to an advantageous embodiment of the present application, the cavities communicate with each other through passages formed in the reinforcement, the passages being filled with the matrix.

According to an advantageous embodiment of the present application, the cavities are generally polyhedrons, for example cubes or tetrahedrons.

According to an advantageous embodiment of the present application, at least one, preferably several, possibly all polyhedrons edges are beveled so as to leave there between portions of the reinforcement which form interconnected bars.

According to an advantageous embodiment of the present application, the bars have the same characteristics as the rods of the reinforcement of the blade according to the present application.

According to the present application, all the different technical characteristics listed above can be combined.

The present application also relates to an iterative method for manufacturing a composite turbomachine blade, the blade comprising a matrix and a reinforcement, remarkable in that the matrix and the reinforcement are manufactured simultaneously by additive manufacturing with layers, preferably based on powders.

According to an advantageous embodiment of the present application, the method includes repeating the following steps: (a) deposition of filler material forming the reinforcement; (b) rendering cohesive the reinforcement filler material; (c) cooling; (d) depositing filler material forming the matrix; (e) rendering cohesive the matrix filler material; cooling step (c) being optional.

According to an advantageous embodiment of the present application, steps (a) and (d) are performed simultaneously and/or steps (b) and (e) are performed simultaneously.

According to an advantageous embodiment of the present application, the three-dimensional reinforcing structure is a unitary structure with rods interconnected with material continuity by connecting nodes, and a majority of the rods are inclined relative to the layers, preferably inclined by more than 5°, more preferably inclined more than 15°.

According to an advantageous embodiment of the present application, the three-dimensional reinforcing structure is a unitary structure with rods interconnected with material continuity by connecting nodes, and the layers are stacked in a stacking direction, the rods are predominantly inclined to the stacking direction, preferably by more than 10°, more preferably more than 20°.

According to an advantageous embodiment of the present application, the three-dimensional reinforcing structure is a unitary structure with rods interconnected with material continuity by connecting nodes, and the roughness Ra of the rods is greater than 2 μm, preferably greater than 10 μm, more preferably greater than 50 μm.

According to an advantageous embodiment of the present application, the layer thickness is less than 200 μm, preferably less than 50 μm, more preferably less than 10 μm.

According to an advantageous embodiment of the present application, the powders comprise grains of size that is less than 200 μm, preferably less than 2 μm, more preferably less than 50 nm.

According to an advantageous embodiment of the present application, cohesion is performed by heating the powder, preferably by means of a laser or an electron beam.

According to an advantageous embodiment of the present application, the method comprises a repetition, preferably several repetitions of steps (a) deposition of material forming the reinforcement and (b) rendering cohesive the reinforcement material, between two achievements of step (d) deposition of the filler material forming the matrix.

The present application also relates to a turbomachine comprising at least one blade, remarkable in that the blade is according to the present application and/or the blade is manufactured according to a method of manufacturing a composite blade according to the present application.

The present application can reinforce a composite blade by giving a three-dimensional reinforcement extending inside the blade. Such reinforcement brings to the blade homogeneous resistance to mechanical stresses. Reinforcement forms a heterogeneous skeleton through rods whose forms are locally adapted in response to stresses in the composite material. In addition, the rods and the walls are connected, thereby improving the robustness of the assembly.

The use of an additional manufacturing process allows manufacturing of a blade where the handling necessary for such a blade is reduced. The simultaneous realization of reinforcement and matrix allows complex shapes. This technique facilitates the achievement of such curved channels, which extend along the blade and which are bounded by both the matrix and the reinforcement. Furthermore, the additional manufacturing, for example based on powders, creates rods with a granular surface which favors the anchoring of the matrix on each rod.

In the following description, the terms interior or internal and exterior or external refer to a position in relation to the axis of rotation of an axial turbomachine.

FIG. 1 schematically shows an axial turbomachine. It is in this case a double-flow turbojet. The turbojet 2 comprises a first compression level designated low-pressure compressor 3, a second level of compression designated high pressure compressor 6, a combustion chamber 8 and one or more levels of turbines 10. During operation, the mechanical power of the turbine 10 transmitted via the central shaft to the rotor 12 moves the two compressors 3 and 6. Means for increasing the transmission ratio may increase the speed of rotation transmitted to the compressors. Alternatively, the various turbine stages may each be connected to compressor stages via concentric shafts. These compressor stages include several blade rows associated with blade rows rotor stators. Rotation of the rotor about its axis of rotation 14 generates a flow of air and gradually compresses the latter until the entry of the combustion chamber 10.

An intake fan 16 is coupled to the rotor 12 and generates an air flow which is divided into a primary flow 18 passing through the above mentioned different stages of the turbomachine, and a secondary flow 20 through an annular conduit (shown in part only) along the machine and then join the main flow at the turbine outlet. The primary flow 18 and secondary flow 20 are annular; they are channeled by the casing of the turbomachine. For this purpose, the casing has cylindrical walls or shells which may be internal and external.

Figure 2:
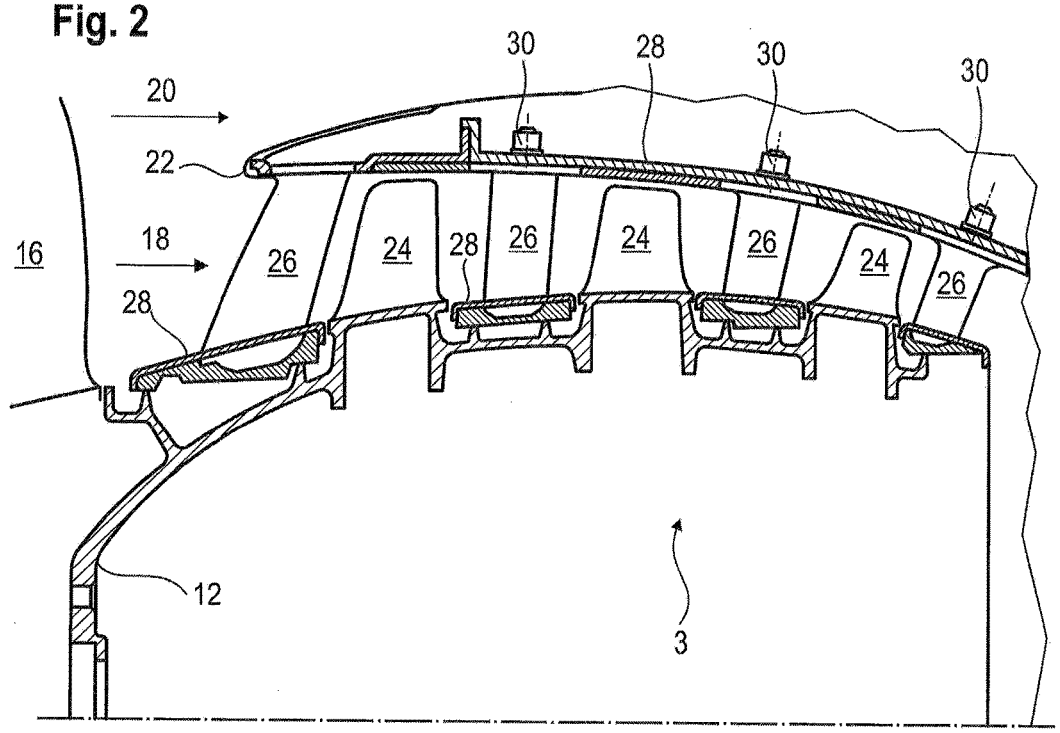
FIG. 2 is a diagram of a turbomachine compressor according to the present application.

FIG. 2 is a sectional view of an axial compressor of a turbomachine 2 as that of FIG. 1. The compressor may be a low-pressure compressor or high-pressure 3. One can observe a portion of the fan 16 and the separation nozzle 22 for the primary flow 18 and secondary flow 20. The rotor 12 comprises several rows of rotor blades 24, in this case three.

The low pressure compressor 3 comprises a plurality of rectifiers, in this case four, which each contain a row of stator blades 26. Rectifiers are associated with the fan 16 or a row of rotor blades to redress or rectify the flow of air, so as to convert the velocity of the flow into pressure.

The stator blades 26 extend substantially radially from an outer casing 28, and can be fixed by means of fixing means such a threaded rod 30. They are regularly spaced from each other and have a same angular orientation in the flow. Advantageously, the blades of one row are identical. Optionally, the spacing between the blades can vary locally as their angular orientation. Some blades may be different from the rest of the blades of their row.

Figure 3:
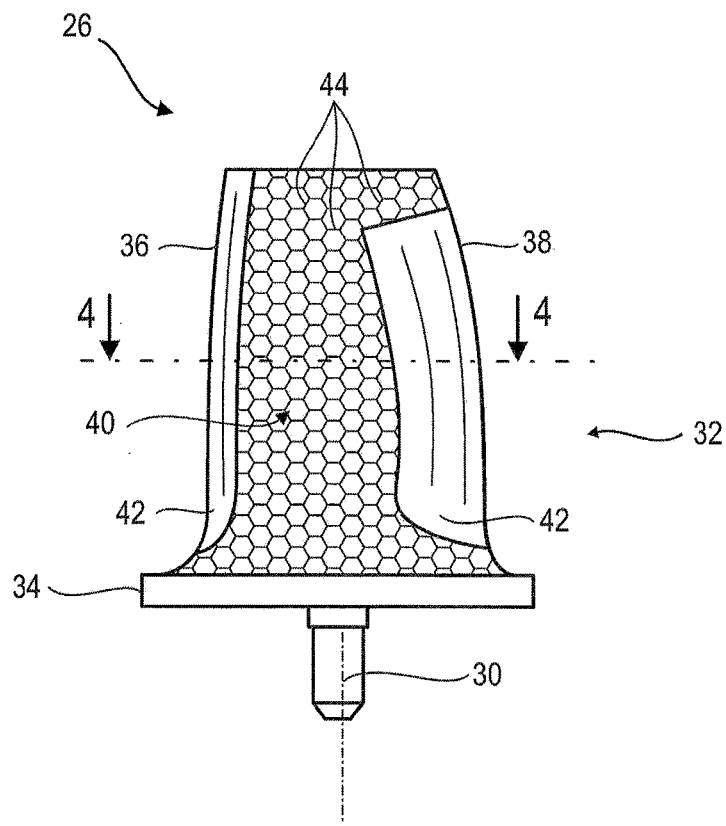
FIG. 3 illustrates a blade of the present application.

FIG. 3 is an illustration of a stator blade 26 of the rectifier according to the present application. The blade may be a compressor blade or a turbine blade.

The blade 26 includes an airfoil 32, or body, for extending into the annular flow. It may comprise an outer platform 34 for attachment to the outer casing of the compressor. The blade 32 can include a second platform disposed on the interior side. Fastening means 30 may extend from the platform 34 opposite the blade 32. The airfoil of the blade may be directly fixed to the casing of the turbomachine, such as by welding. In this case, the blade may be free of external platform. The inner end of the blade may comprise an opening to serve as an anchor to an inner annular ferrule.

According to an alternative of the present application, the blade may be a rotor blade. As a fixing means, such a blade may include a dovetail for insertion into a corresponding groove of the rotor. The blade can be a fan blade.

The blade 26 has a leading edge 36 disposed upstream, and a trailing edge 38 located downstream. It also has a pressure side surface disposed on the discharge side of the blade, and a suction side surface disposed on the suction side of the blade. The pressure side surface and the suction side surface extend from the leading edge 36 to the trailing edge 38. They are curved and convex respectively, and define the shape of the blade airfoil 32.

The blade 26 comprises a composite material with a matrix (not shown) and a reinforcement 40. The reinforcement 40 comprises a mesh forming a three-dimensional structure. The three dimensional structure may extend over the majority of the volume of the airfoil 32 of the blade, possibly over all of said volume. The three dimensional structure may extend over the majority of the thickness of the blade between the pressure side surface and the suction side surface. The three dimensional structure may extend over the majority of the length of the blade 26 between the leading edge 36 and trailing edge 38. Thickness of the blade can be taken perpendicular to the chord; the length of the blade can be seen along the chord.

The three dimensional structure can comprise a three-dimensional mesh, which is optionally defined by polyhedrons filling the volume between the pressure side surface and the suction side surface. The polyhedrons may be defined by link nodes. The reinforcement may have interconnected cavities which form a network of channels which extend over the majority of the blade, which preferably extend generally over the whole volume of the airfoil. Advantageously, the cavity is filled by the reinforcing matrix. Advantageously, the platform(s) and/or the fastening means are secured to the reinforcement. Preferably, they are integral.

Optionally, the reinforcement 40 of the blade 26 includes a wall 42 forming the leading edge of the blade. The wall 42 may be a plate extending from the pressure side and the suction side. The reinforcement 40 of the blade may comprise a wall 42 forming at least a portion of the suction side surface or at least a portion of the pressure side surface so as to protect the blade 26 against abrasion.

The three-dimensional structure comprises rods 44. Rods 44 are connected or secured to each other, e.g. with material continuity via connecting nodes or junctions. Preferably, each of the rods is directly connected to other rods, optionally to more than three rods. These rods 42 are scattered or distributed in the volume between the pressure side surface and the suction side surface. These rods 44 may be distributed in the majority of said volume, preferably throughout said volume. The rods 44 can be connected to each other by their ends. They are arranged end to end.

The reinforcement 40 is preferably formed integrally. The rods 44 are connected together are made integrally, preferably the walls 42 and the rods 44 are formed integrally. Thus, the rods 44 are secured to the walls 42 and form an integral mechanical assembly.

Figure 4:
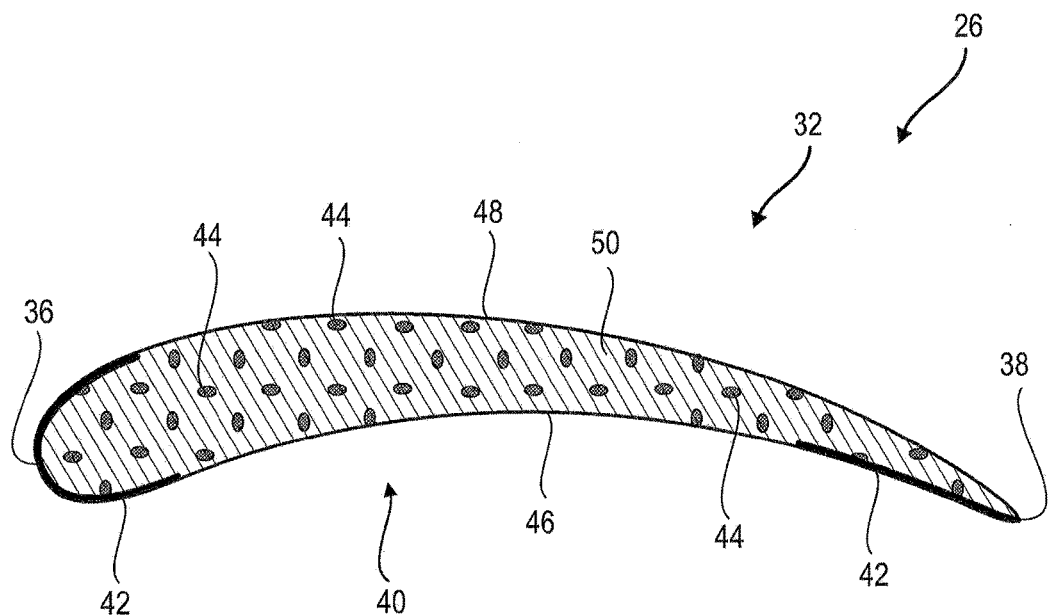
FIG. 4 shows a section of the blade according to the present application along the axis 4-4 plotted in FIG. 3.

FIG. 4 outlines a cross-section of the blade along the axis 4-4 in FIG. 3.

The average thickness of the reinforcement 40 can represent more than 10%, preferably more than half of the average distance between the pressure side surface 46 and the suction side surface 48 of the blade. Optionally, the average thickness of the space occupied by the rods 44 connected to each other corresponds to more than 10%, preferably more than half of the average spacing between the pressure side surface 46 and suction side surface 48.

The rods 44 are embedded in the matrix 50. Matrix 50 occupies most of the volume of the blade 32, preferably over 75%. The matrix 50 may form the majority of the pressure side surface 46 and/or the suction side surface 48. Rods 44 may be flush and form portions of the pressure side surface 46 and/or the suction side surface 48. Matrix 50 can form the leading edge 36 and/or the trailing edge 38.

The rods 44 are generally connected to other rods 44. Most rods 44 are linked to several other rods 44, preferably at least six, more preferably at least eight other rods 44. Rods 44 interconnected other form continuous mechanical linkages which extend from the leading edge 36 to trailing edge 38, and/or from the pressure side surface 46 to the suction side surface 48 and/or from the internal end of the blade to the external end of the blade. These mechanical connections have a continuity of material. The rods may form an interconnected three dimensional structure. They can form a three-dimensional mesh. A three-dimensional mesh means, for example a set comprising a plurality of parallel meshes which are interconnected by means of transverse rods.

The reinforcement 40 and the matrix 50 are made of different materials. The reinforcement 40 may be made of metal, preferably titanium, possibly steel or aluminum. The matrix 50 may be a polymer, e.g. a thermoplastic resin such as polyetherimide (PEI). Alternatively, the reinforcement 40 may comprise a ceramic material, preferably essentially be made of ceramic and include a polymer resin. According to another alternative of the present application, the reinforcement may be of metal and include a ceramic matrix.

The reinforcing material may have a higher modulus of elasticity than the modulus of elasticity of the matrix material. Optionally, the tensile strength of the material of the reinforcement is greater than the tensile strength of the matrix material.

Figure 5:
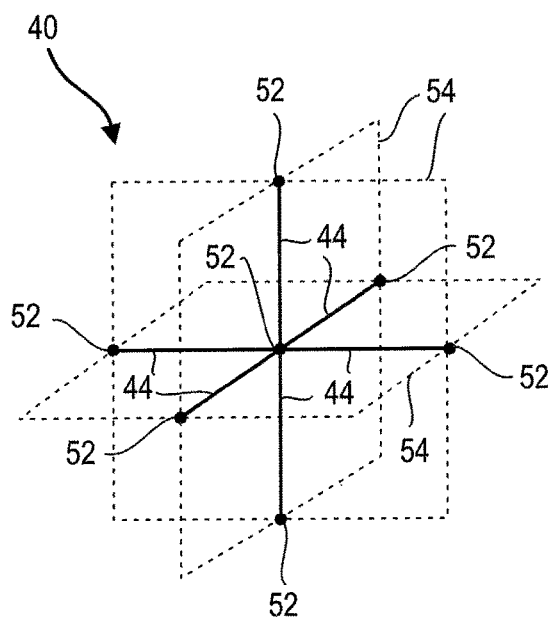
FIG. 5 outlines an arrangement of the reinforcement rods of the blade according to a first embodiment of the present application.

FIG. 5 outlines a layout of a rod 44 of the reinforcement portion 40 of the blade according to a first embodiment of the present application. The orientation of the rods may vary locally.

The rods 44 are arranged in three non-coplanar directions. The three directions may be inclined relative to each other at different angles. Three directions can be at right angles. The rods 44 then define hexahedra such as cubes whose edges may be inclined relative to the height of the blade.

The rods 44 are interconnected connecting nodes 52. Connecting nodes are typically divided into three sets of planes 54. Each set of planes 54 comprises parallel planes, the sets 54 being inclined with each other. A connecting node 52 may be connected to six other connecting nodes 52, preferably non-coplanar. The connecting nodes may be arranged on sets of curved surfaces, e.g. concave surfaces generally conforming to the pressure side surface or the suction side surface of the blade.

The rods 44 generally have the same length and the same section. The rods 44 may be straight and round. However, the length of the rods 44 may vary, as do their sections. A rod may have a different section of the other rods. One rod can see its section change, for example in diameter or in shape. A rod can have a round cross section at one end and a square cross section at the other end. At least one rod may be curved or angled. At least one rod may be flat, spherical or cubic.

The rods 44 may have a length of less than 40 mm, preferably less than 10 mm, more preferably less than 2 mm. The rods 44 may have a width less than 5 mm, preferably less than 0.50 mm, more preferably less than 0.10 mm.

Figure 6:
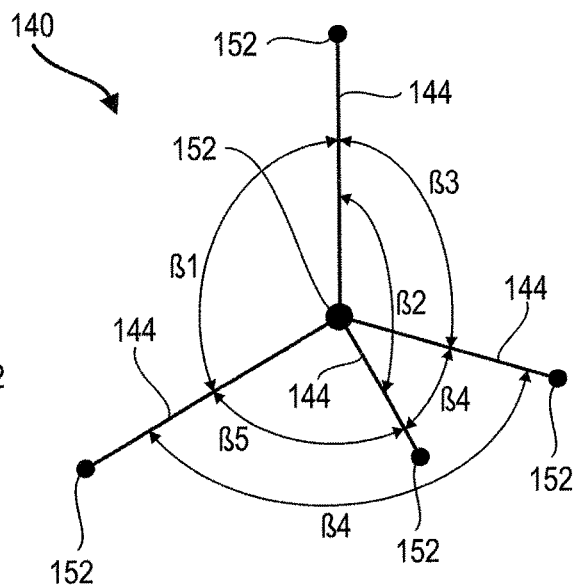
FIG. 6 illustrates an arrangement of the reinforcement rods of the blade according to a second embodiment of the present application.

FIG. 6 shows an arrangement of the rods 144 of the reinforcement portion 140 of the blade according to a second embodiment of the present application. This FIG. 6 shows the numbering of the preceding figures for the same or similar elements, however the numbering is incremented by 100.

The rods 144 are arranged in four non-coplanar directions, preferably by at least four non-coplanar directions. A connecting node 152 of the rods 144 is connected to four other connecting nodes 152 of rods 144 which form a tetrahedron, whose center can be occupied by the common connecting node. The orientation and length of the rods vary within the reinforcement. The four directions between them define different angles ($\beta 1$, $\beta 2$, $\beta 3$, $\beta 4$, $\beta 5$, $\beta 6$). These angles can be equal.

According to one alternative of the present application, the reinforcement rods can be arranged in six directions, some branches being coplanar. The rods can form pyramids with a triangular base. In this configuration, a same connecting node can be connected directly to twelve other connecting nodes.

According to another alternative of the present application, the reinforcement rods are arranged by combining the rods arrangements shown above.

Figure 7:
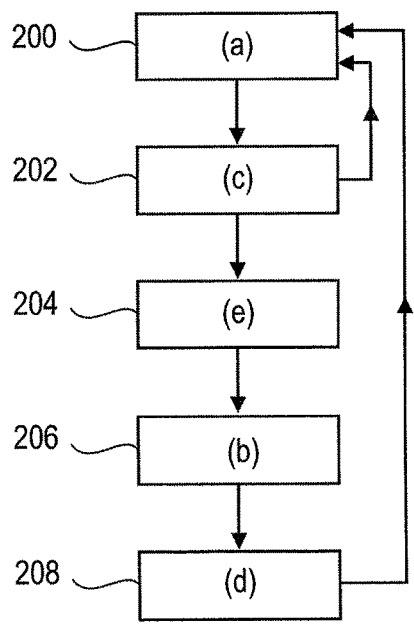
FIG. 7 shows a diagram of an iterative method for manufacturing a blade according to a third embodiment of the present application.

FIG. 7 shows a diagram of an iterative method for fabricating a blade according to a third embodiment of the present application.

The blade is made by additional layered manufacturing. The layers may be flat and/or of constant thickness. The blade includes the simultaneous manufacture of its reinforcement and its matrix. The blade is made from layers of filler materials. The filler materials may be applied in molten form or in the form of powders which are subsequently solidified. The cohesion of the powders is achieved by heating the powder, for example using a laser or an electron beam.

The powders have particle sizes less than 0.50 mm grains. Optionally powders are nano-powders, whose grains have a mean diameter of grains less than or equal to 50 nanometers. The layers forming the reinforcement may have a thickness of less than 0.50 mm, preferably less than 100 µm. The reinforcing layers may be of lower thickness than the matrix layers.

The iterative process of realization of the blade may include repeating the following steps:
  (a)-deposition of filler material forming the reinforcement 200,
  (c)-cohesion of the reinforcement filler material 202,
  (e)-cooling 204
  (b)-deposition of filler material forming the matrix 206,
  (d)-cohesion of the matrix filler material 208.

The method comprises the sequence of previous tasks until a complete blade is achieved. The blade is made by layers. A layer can form a profile of the blade. Each layer may comprise at least one layer of reinforcing material, preferably of several layers of reinforcing material, and at least one layer of matrix material. Some layers may comprise only material that forms the reinforcement, for example to make the platform of the blade or its fastenings material.

The cooling stage 204 is optional. It may be beneficial when the reinforcement material and the matrix filler materials have distant cohesion temperatures, for example if the cohesion temperature of one of the materials can damage the other material. Another solution to avoid the cooling step 204 is to work with particularly thin layers, whose thickness allows for almost instantaneous cooling of the material which has just been applied. For example, metal layers with thicknesses of less than 200 µm, preferably less than 50 µm, more preferably less than 20 µm allow rapid cooling due to the heat capacity of the preceding layers of solidified material.

The method may include repeating the deposition of the material 200 forming the reinforcement and rendering cohesive the material forming the reinforcement 202 before performing a step of depositing the filler material forming the matrix material 206. Several reinforcement deposition and cohesion cycles can be made between two matrix deposition steps 206. Some rods may be welded to the other rods; optionally the majority or all of the rods are welded together.

The layers form a stack that is possible oriented along the height of the blade, the height of the blade may correspond to a radial direction of the turbine engine. The rods may be inclined relative to the direction of the stack. Preferably, the majority of the rods are inclined relative to the stack, more preferably by more than 5°, more preferably more than 20°. The rods can be predominantly inclined to the layers, preferably by more than 5°, more preferably more than 20°.

The surface of the rods may roughened, with grain shapes protruding and forming cavities. This rough aspect may result from grains of the material, optionally from powder, the cohesion of which maintaining the general shape. The rod surface may have a roughness Ra greater than 5 µm, preferably greater than 50 µm. Roughness Ra is the integral mean value of the differences in absolute height variations of a given profile. The method used permit to create a metallic reinforcement with rods whose grains have a homogeneous size.

The surface condition improves anchorage between the rods and the matrix. We note in passing that the additive layer manufacturing process promotes the filling of the grainy surface of the rods by the matrix, and in particular the filling of possible cavities by the matrix.

The blade can be made of mixed manner. The platform and the fixing means may be made by molding, by machining, forging. The platform can then be used as a basis on which the reinforcement is formed by additive layer manufacturing.

Figure 8:
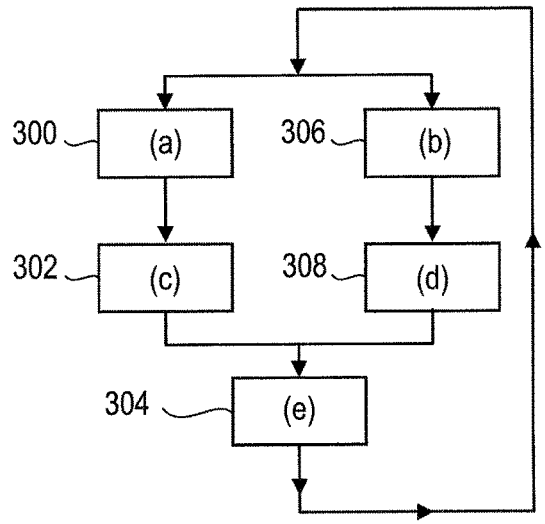
FIG. 8 illustrates a diagram of an iterative method for manufacturing a blade according to a fourth embodiment of the present application.

FIG. 8 shows an iterative process for manufacturing a blade according a fourth embodiment of the present application. This FIG. 8 shows the numbering of the previous figure for the same or similar elements, however the numbering incremented by 100.

The method includes repeating the following steps:
(a) deposition of the filler material 300 forming the reinforcement,
(b) deposition of the filler material forming the matrix 306,
(c) rendering cohesive the reinforcement filler material 302,
(d) rendering cohesive the matrix filler material 308, and
(e) 304 cooling.

Cooling step 304 is optional.

The steps of depositing filler material 300 and 306 may be performed simultaneously. Similarly, the steps of rendering cohesive the filler material 300 and 308 may be performed simultaneously.

It will be appreciated to those skilled in the art that different embodiments of the present application and various alternatives can be combined.

I claim:

1. A blade for a turbomachine, comprising:
a leading edge;
a trailing edge;
a pressure side surface; and
a suction side surface;
wherein the pressure side surface and the suction side surface extend from the leading edge to the trailing edge;
wherein the blade is formed from a composite material having a matrix and a reinforcement having a mesh; and wherein the mesh forms a three-dimensional structure which extends over the majority of the thickness of the blade between the pressure side surface and the suction side surface and/or the majority of the length of the blade between the leading edge and the trailing edge,
said three-dimensional structure including a grainy surface with protruding grains embedded in the matrix.

2. The blade according to claim 1, wherein the three-dimensional reinforcement structure is a unitary structure with rods interconnected with material continuity by connecting nodes.

3. The blade according to claim 2, wherein the rods are oriented in at least three non-coplanar directions.

4. The blade according to claim 2, wherein the rods are oriented in at least four non-coplanar directions.

5. The blade according to claim 1, wherein the reinforcement occupies more than 60% of the thickness of the blade between the pressure side surface and the suction side surface.

6. The blade according to claim 1, wherein the reinforcement occupies more than 80% of the thickness of the blade between the pressure side surface and the suction side surface.

7. The blade according to claim 1, wherein the volume density of the mesh between the pressure side surface and the suction side surface varies along the height of the blade and/or from the leading edge to the trailing edge.

8. The blade according to claim 1, wherein the reinforcement comprises: one or more walls forming the leading edge and/or trailing edge, and/or the pressure side surface and/or the suction side surface of the blade, the one or more walls being unitary with the mesh.

9. The blade according to claim 1, wherein the matrix and the reinforcement are made of different materials, the matrix comprising:
a thermoplastic resin; and
the reinforcement comprising:
a metal.

10. The blade according to claim 9, wherein the metal is titanium.

11. The blade according to claim 9, wherein the reinforcement is integral and made by a method of additive layer manufacturing exhibiting layers.

12. The blade according to claim 2, wherein the roughness Ra of the rods is one of the following:
greater than 2 µm;
greater than 10 µm; and
greater than 50 µm.

13. The blade according to claim 11, wherein the thickness of the layers is one of the following:
less than 200 µm;
less than 50 µm; and
less than 10 µm.

14. The blade according to claim 11, wherein a majority of the rods are inclined relative to the layers by one of the following:
more than 5°; and
more than 15°.

15. The blade according to claim 11, wherein the layers are stacked in a stacking direction and the rods are inclined predominantly relative to the stacking direction by one of the following:
more than 10°; and
more than 20°.

16. A blade for a turbomachine, comprising:
a leading edge;
a trailing edge;
a pressure side surface; and
a suction side surface;

wherein the pressure side surface and the suction side surface extend from the leading edge to the trailing edge;

wherein said blade comprises from a composite material having a matrix and a reinforcement having a mesh; and wherein said mesh is formed by rods with a roughness Ra which is one of the following:

greater than 2 μm;

greater than 10 μm; and greater than 50 μm.

17. The blade according to claim 16, wherein the rods forms a three-dimensional structure which extends over the majority of the thickness of the blade between the pressure side surface and the suction side surface.

18. The blade according to claim 16, wherein the rods forms a three-dimensional structure which extends over the majority of the length of the blade between the leading edge and the trailing edge.

19. A blade for a turbomachine, comprising a solid body with:

a leading edge;

a trailing edge;

a pressure side surface; and a suction side surface;

wherein the pressure side surface and the suction side surface extend from the leading edge to the trailing edge;

wherein said solid body is formed from a composite material having a matrix and a reinforcement having a mesh; and wherein the mesh forms a three-dimensional structure with rods which extends over the majority of the thickness of the solid body between the pressure side surface and the suction side surface and/or the majority of the length of the solid body between the leading edge and the trailing edge, said rods including a grainy surface with cavities filled by the matrix.

20. The blade according to claim 19, wherein the rods and the matrix extend over the majority of the volume of said blade.

* * * * *